United States Patent

Ikegaya et al.

(10) Patent No.: US 10,246,121 B2
(45) Date of Patent: Apr. 2, 2019

(54) VEHICLE STEERING DEVICE

(71) Applicant: HONDA MOTOR CO., LTD., Tokyo (JP)

(72) Inventors: Manabu Ikegaya, Wako (JP); Kenichi Kirihara, Wako (JP); Yoshito Nakamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 102 days.

(21) Appl. No.: 15/604,967

(22) Filed: May 25, 2017

(65) Prior Publication Data

US 2017/0341679 A1    Nov. 30, 2017

(30) Foreign Application Priority Data

May 27, 2016 (JP) .................................. 2016-106542

(51) Int. Cl.
| | | |
|---|---|---|
| B62D 5/04 | (2006.01) | |
| B62D 5/00 | (2006.01) | |
| B62D 6/00 | (2006.01) | |
| B62D 6/02 | (2006.01) | |

(52) U.S. Cl.
CPC .............. *B62D 5/003* (2013.01); *B62D 6/002* (2013.01); *B62D 6/02* (2013.01); *B62D 5/04* (2013.01)

(58) Field of Classification Search
CPC .......... B62D 5/033; B62D 6/002; B62D 6/02; B62D 5/04
See application file for complete search history.

(56) References Cited

U.S. PATENT DOCUMENTS

| | | | | |
|---|---|---|---|---|
| 2007/0144815 A1* | 6/2007 | Tsutsumi | ............... | B62D 5/003 |
| | | | | 180/402 |
| 2009/0188226 A1* | 7/2009 | Carlson | .................. | A01D 34/64 |
| | | | | 56/10.2 R |
| 2013/0233639 A1 | 9/2013 | Kodato et al. | | |
| | | (Continued) | | |

FOREIGN PATENT DOCUMENTS

| | | |
|---|---|---|
| CN | 103303359 A | 9/2013 |
| CN | 104837704 A | 8/2015 |
| | (Continued) | |

OTHER PUBLICATIONS

Chinese Office Action dated Dec. 25, 2018 with English Translation, 12 pages.

*Primary Examiner* — Kevin Hurley
*Assistant Examiner* — Marlon A Arce
(74) *Attorney, Agent, or Firm* — Rankin, Hill & Clark LLP (57) ABSTRACT

A vehicle steering device includes: steering reaction force generation device having a steering wheel and a steering reaction force motor; steering reaction force motor resolver for detecting steering angle; turning device having a steering motor and capable of turning steered wheels, in a state being mechanically disconnected from the steering reaction force generation device; steering motor resolver for detecting turning angle; drive control section for performing drive control of the steering motor; and vehicle speed sensor for detecting the vehicle speed of vehicle. The drive control section performs drive control of the steering motor if vehicle speed exceeds vehicle speed threshold for the first time after ignition switch is turned on and if specific phase shift based on type and magnitude of phase shift occurs.

4 Claims, 2 Drawing Sheets

(56) References Cited

U.S. PATENT DOCUMENTS

| | | | |
|---|---|---|---|
| 2015/0314803 A1 | 11/2015 | Kojo et al. | |
| 2015/0336607 A1 | 11/2015 | Inoue | |
| 2016/0016606 A1* | 1/2016 | Tsubaki | B62D 5/0472 701/41 |
| 2017/0120948 A1* | 5/2017 | Kitazume | B62D 5/0409 |

FOREIGN PATENT DOCUMENTS

| | | |
|---|---|---|
| CN | 104955701 A | 9/2015 |
| JP | 2014-221592 A | 11/2014 |
| JP | 2015-157548 A | 9/2015 |
| JP | 2015-171837 A | 10/2015 |

* cited by examiner

FIG. 1

VEHICLE STEERING DEVICE

CROSS REFERENCE TO RELATED APPLICATION

This application claims the priority of Japanese Patent Application No. 2016-106542, filed on May 27, 2016, the entire specification, claims and drawings of which are incorporated herewith by reference.

BACKGROUND OF THE INVENTION

Field of the Invention

The present invention relates to a vehicle steering device of a steer by wire type.

Description of the Related Arts

The applicant of the present application has presented an art to resolve phase shift, on a vehicle steering device of a steer by wire type (hereinafter referred to as "SBW type") in the event of occurrence of phase shift related to the correspondence relationship between the steering angle of a steering wheel and the turning angle of steered wheels (see Patent Literature 1).

A vehicle steering device according to Patent Literature 1 includes: a steering reaction force generation device having a steering reaction force motor; a steering reaction force motor resolver for detecting the steering angle of a steering wheel; a wheel turning device having a turning motor; a turning motor resolver for detecting the turning angle of steered wheels; a determination section for determining presence or absence of occurrence of phase shift related to the correspondence relationship between the steering angle and the turning angle; and a drive control section for drive control of the turning motor to make the turning angle of the steered wheels follow a target turning angle.

Position shift occurs, for example, if steering wheel operation is performed with a strong steering force during when the motion of steered wheels is restrained, for example, in a state that either of the steered wheels is up against a curb of a road or stuck in a gutter.

In a case that a phase shift occurs and it is predicted that the phase shift cannot be resolved even if correction of the turning angle of the steered wheels is tried by driving the turning motor, the drive control section performs drive control of the steering reaction force motor, and thus resolves the phase shift by correcting the steering angle of the steering wheel.

By the vehicle steering device of a SBW type according to Patent Literature 1, even when a phase shift related to the correspondence relationship between the steering angle and the turning angle occurs, the phase shift can be adequately resolved.

PATENT LITERATURES

Patent Literature 1; JP 2015-171837 A

SUMMARY OF THE INVENTION

Incidentally, phase shift related to the correspondence relationship between the steering angle and the turning angle occurs in various forms. Concretely, as types of phase shift, there are same direction phase shift, in which the steering direction and the turning direction are the same, and inverse phase shift, in which the steering direction and the turning direction are opposite to each other. Further, respectively for the same direction phase shift and for the inverse phase shift, magnitudes are different. Out of phase shifts in various forms categorized based on the type and the magnitude of phase shift, especially, how to inhibit a specific phase shift which gives a driver a strange feeling, which is comparatively significant, becomes an issue.

In this point of view, the vehicle steering device of a SBW type according to Patent Literature 1 does not disclose nor suggest how to inhibit a specific phase shift when the specific phase shift based on the type and the magnitude of phase shift occurs.

The present invention has been developed, to address such a situation, and an object of the invention is to provide a vehicle steering device capable of adequately inhibiting a specific phase shift, which is based on the type and the magnitude thereof, even when the specific phase shift occurs.

In order to attain the above object, a vehicle steering device in a first aspect of the present invention includes: a steering section having a steering member operated in turning steered wheels of a vehicle; a steering angle detection section for detecting a steering angle of the steering member; a turning section having a turning actuator for applying a turning force for turning the steered wheels and being capable of turning the steered wheels in a state that the turning section is mechanically disconnected from the steering section; a turning angle detection section for detecting a turning angle of the steered wheels; a control section for performing drive control of the turning actuator; and a vehicle speed detection section for detecting vehicle speed of the vehicle.

If the vehicle speed exceeds a predetermined vehicle speed threshold for the first time after an ignition switch is turned on and if a specific phase shift related to correspondence relationship between the steering angle and the turning angle occurs, the control section performs drive control of the turning actuator to thereby correct the turning angle of the steered wheels such that the turning angle of the steered wheels matches the steering angle of the steering wheel.

Herein, the specific phase shift based on the type and the magnitude of phase shift, is assumed to be a phase shift that gives a comparatively strong (to an extent such as to interfere driving) strange feeling to a driver is assumed. As the predetermined vehicle speed threshold, for example, a comparatively low vehicle speed of slow driving or so can be set, as appropriate.

Incidentally, if the vehicle speed exceeds the certain vehicle speed threshold for the first time after the ignition switch is turned on, the operation for inhibiting the specific phase shift is performed, by the following reason. That is, if correction is made, during when the vehicle is moving, such as to make the turning angle of the steered wheels match the steering angle of the steering wheel, the driving torque of the turning actuator can be lowered, compared with a case of performing the above correction during when the vehicle is in a stop state. Further, in another point of view, it is also aimed at avoiding a time when the vehicle is in a stop state in which checking or the like of the vicinity of the turning section may be being performed by a checker. Herein, the correction of the turning angle of the steered wheels such that the turning angle matches the steering angle of the steering wheel includes a concept of making the turning angle of the steered wheels approach the steering angle of the steering wheel for consistency (an incomplete consistency state after correction).

According to the first aspect of the invention, if it is determined that the vehicle speed exceeds the vehicle speed threshold for the first time after the ignition switch has turned on and that the specific phase shift based on the type and the magnitude of phase shift occurs, drive control of the turning actuator is performed. Thus, the turning angle of the steered wheels is corrected such that the turning angle matches the steering angle of the steering member (The turning angle may be in a state of incomplete consistency.) Thus, even when a specific phase shift based on the type and the magnitude of phase shift occurs, this specific phase shift can be adequately inhibited.

Further, in a second aspect of the invention, regarding the vehicle steering device described in the first aspect of the invention, the specific phase shift is a phase shift at a time when correspondence relationship between the steering angle and the turning angle is an inverse phase shift. In the second aspect of the invention, the specific phase shift is defined, based on a point of view of the type of a phase shift, namely whether it is related to same direction phase shift or inverse phase shift.

According to the second aspect of the invention, the specific phase shift is a phase shift at the time when the correspondence relationship between the steering angle and the turning angle is in reverse phase shift. Accordingly, if the correspondence relationship between the steering angle and the turning angle is in reverse phase shift, by adequately inhibiting such a specific phase shift, motion of the steered wheels against the steering will of the driver can be avoided in advance.

Further, in a third aspect of the invention, regarding the vehicle steering device in the second aspect of the invention, the specific phase shift is a phase shift in a state that the steered wheels face towards a right turning direction or a left turning direction despite that the steering member is in a neutral position.

According to the third aspect of the invention, as the specific phase shift is a phase shift in a state that the steered wheels face towards a right turning direction or a left turning direction despite that the steering member is at the neutral position, by adequately inhibiting such a specific phase shift in such an event, motion of the steered wheels against the steering will of the driver can be avoided in advance.

In a fourth aspect of the invention, regarding the vehicle steering device in the second aspect of the invention, the specific phase shift is a phase shift in a state that the steered wheels face a straight-ahead direction despite that the steering member is in either a right turning position or a left turning position.

According to the fourth aspect of the invention, as the specific phase shift is a phase shift in a state that the steered wheels face the straight-ahead direction despite that the steering member is at a right turning position or a left turning position, by adequately inhibiting such a specific phase shift in such an event, motion of the steered wheels against the steering will of the driver can be avoided in advance.

According to the present invention, even when a specific phase shift, which is based on the type and the magnitude thereof, occurs, it is possible to adequately inhibit the specific phase shift.

PREFERRED EMBODIMENT OF THE INVENTION

In the following, an embodiment according to the present invention will be described in detail, referring to the drawings.

Figure 1:
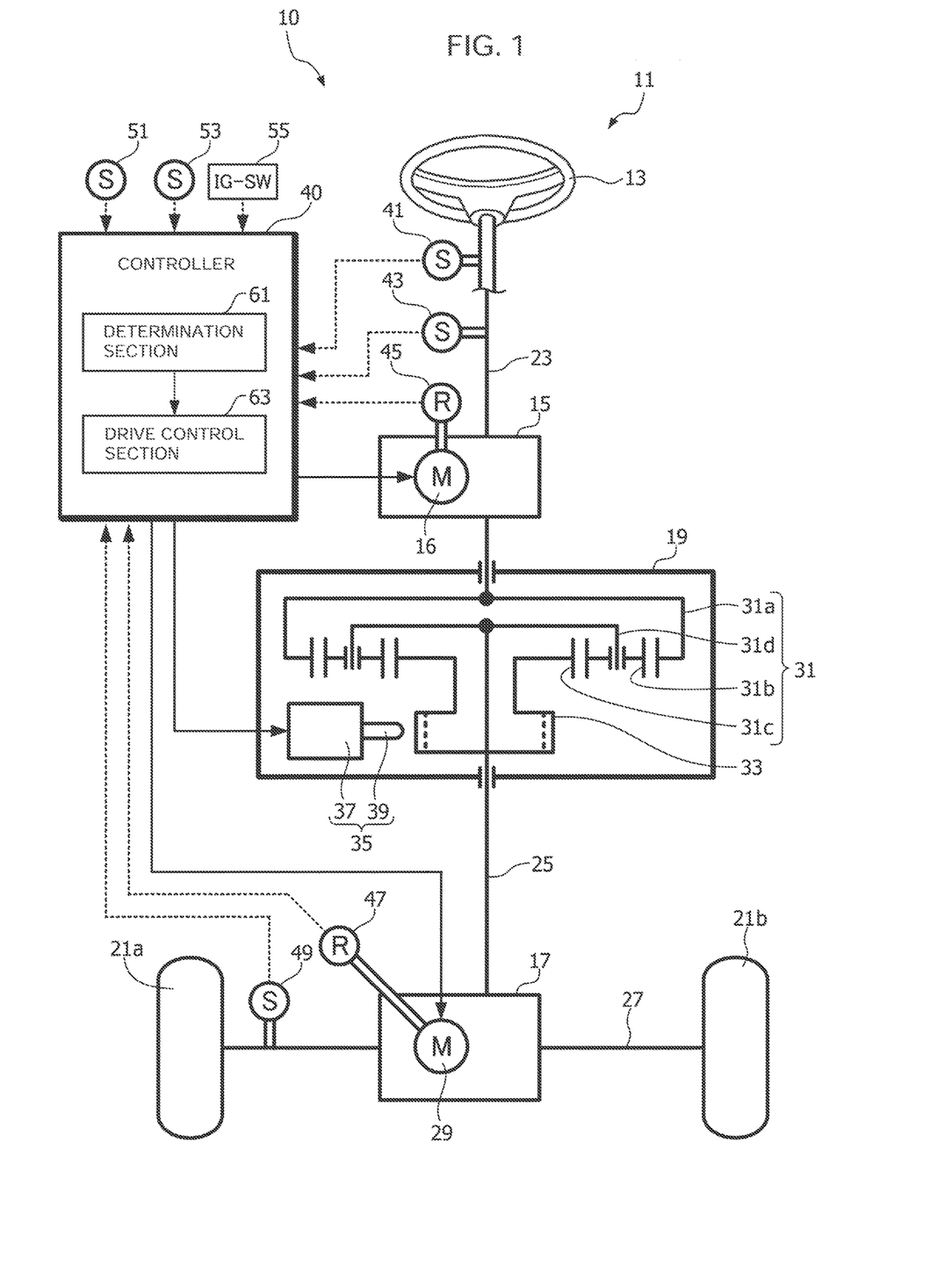
FIG. 1 is a schematic configuration diagram of a vehicle steering device in an embodiment according to the present invention.

FIG. 1 is a schematic configuration diagram of a vehicle steering device in an embodiment according to the present invention.

A vehicle steering device 11 is a steering device of a steer by wire (SBW) type. The vehicle steering device 11 is provided with a function to generate a turning force by a later-described turning motor 29 (SBW mode), for example, an electronic power steering (EPS) function (EPS mode) to generate, when a later-described steering reaction force motor 16 is defective, an assist force by the turning motor 29, the assist force being related to the manual steering by a driver, and a function (manual steering mode) to make the driver perform manual steering, for example, when the steering reaction force motor 16 and the turning motor 29 are defective or an ignition switch 55 is off.

In order to realize the above various functions, the vehicle steering device 11 is, as shown in FIG. 1, provided with a steering wheel 13, a steering reaction force generation device 15, a turning device 17, and a clutch device 19. The vehicle steering device 11 is mounted on a vehicle 10. The vehicle 10 is provided with a pair of steered wheels 21a, 21b.

The steering wheel 13 is a member operated according to driving will related to steering by a driver. The steering wheel 13 is also referred to as "a steering member" in the present application. The steering wheel 13 is provided with a steering shaft 23. The steering shaft 23 is configured to rotate around an axis, according to the operation of the steering wheel 13 by the driver.

The steering reaction force generation device 15 has a function to generate a reaction force (feeling at hand), related to steering, to the hands of the driver gripping the steering wheel 13 when the vehicle steering device 11 is in operation in the SBW mode. The steering reaction force generation device 15 is provided with the steering reaction force motor 16. The steering shaft 23 is connected to the steering reaction force motor 16. The steering reaction force motor 16 generates a steering torque to rotate the steering shaft 23 around the axis. Thus, when the vehicle steering device 11 is operated in the SBW mode, a reaction force (feeling at hand) related to steering is transmitted to the hands of the driver gripping the steering wheel 13.

The steering reaction force generation device 15 provided with the steering wheel 13, the steering shaft 23, and the steering reaction force motor 16 are in together also referred to as "a steering section" in the present application.

The turning device 17 is provided with a function to convert the rotational motion of a turning shaft 25 into linear motion of a rack shaft 27 through a rack and pinion mechanism (not shown). The turning device 17 is provided with the turning motor 29. The turning motor 29 is also referred to as "a turning actuator" in the present application. The turning shaft 25 and the rack shaft 27 are connected to the turning motor 29. The turning motor 29 generates a turning torque to make the rack shaft 27 linearly move along the axial direction. The pair of steered wheels 21a, 21b are connected to the rack shaft 27 through a tie rod, not shown. The pair of steered wheels 21a, 21b are turned by the linear motion of the rack shaft 27.

The turning device 17 provided with the turning shaft 25, the rack shaft 27, and the turning motor 29 are in together also referred to as "a turning section" in the present application.

The clutch device 19 is provided with a function to connect or separate the steering shaft 23 and turning shaft 25 with/from each other. In order to realize this function, the clutch device 19 is provided with a planetary gear train 31. The planetary gear train 31 includes an internal gear 31a, planetary gears 31b, a sun gear 31c, and a planet carrier 31d.

Further, the clutch mechanism 19 is also provided with a locking gear 33 and a lock device 35. The lock device 35 includes a lock pin 39 engaging with a tooth space of the locking gear 33, and an electromagnetic solenoid 37 for driving the lock pin 39.

The internal gear 31a is fixed to the steering shaft 23, at the side end portion of the turning device 17, and is arranged such as to rotate integrally with the steering shaft 23. The sun gear 31c is rotatable around a rotation axis that is common with the axis of the turning shaft 25. Plural planetary gears 31b are provided such as to engage with both the sun gear 31c and the internal gear 31a. Each of the plural planetary gears 31b is axially supported to be able to rotate relative to the planet carrier 31d that rotates integrally with the turning shaft 25.

The locking gear 33 is an external gear. The locking gear 33 rotates integrally with the sun gear 31c. The lock pin 39 is urged by an urging member, not shown, in the direction toward the locking gear 33. An arrangement is made such that when the lock pin 39 engages with a tooth space of the locking gear 33, the rotational motion of the locking gear 33 is restricted.

The electromagnetic solenoid 37 displaces the lock pin 39 such as to draw in the lock pin 39 by supply of excitation current so as to release the engagement between the lock pin 39 and the locking gear 33.

The lock device 35 operates, according to a control signal transmitted from the controller 40. The controller 40 operates to release the engagement of the lock pin 39 with the locking gear 33 by supply of excitation current to the electromagnetic solenoid 37.

In the following, the action of the clutch device 19 will be described. If the lock pin 39 engages with the tooth space of the locking gear 33, the rotational motion of the sun gear 31c rotating integrally with the locking gear 33 is restricted.

When the driver operates the steering wheel 13 in a state that the rotational motion of the sun gear 31c is restricted, the internal gear 31a rotates in association with the rotation of the steering shaft 23. Herein, as the rotational motion of the sun gear 31c is restricted, the planetary gears 31b orbit the sun gear 31c, while spinning. By the orbit of the planetary gears 31b, the planet carrier 31d, which axially supports the planetary gears 31b, and the turning shaft 25, which rotates integrally with the planet carrier 31d, rotate.

In short, in a state that the lock pin 39 is engaged with a tooth space of the locking gear 33, the clutch mechanism 19 is in a connected state for connecting the steering shaft 23 to the turning shaft 25. Herein, the rotation force of the steering shaft 23 is transmitted to the turning shaft 25.

On the other hand, when the engagement of the lock pin 39 with the tooth space of the locking gear 33 is released, the sun gear 31c rotating integrally with the locking gear 33 becomes freely rotatable.

In a state that the sun gear 31c is freely rotatable, when the driver operates the steering wheel 13, the internal gear 31a rotates in association with the rotation of the steering shaft 23. Herein the planetary gears 31b act to orbit the sun gear 31c, while spinning. However, the planet carrier 31d is connected through the turning shaft 25 and the rack shaft 27 with the steered wheels 21a, 21b. Accordingly, the resistance force against the rotation of the planet carrier 31d is significantly stronger than the resistance force against the rotation of the sun gear 31c, which is in a state of being freely rotatable. Thus, when the planetary gears 31b spin, the sun gear 31c rotates (spins), and the planet carrier 31d does not rotate. That is, the turning shaft 25 does not rotate.

In short, in a state that the engagement of the lock pin 39 with the tooth space of the locking gear 33 is released, the clutch mechanism 19 becomes a disconnected state between the steering shaft 23 and the turning shaft 25. Herein, the rotation force of the steering shaft 23 is not transmitted to the turning shaft 25.

In the following, an input/output system for the controller 40 will be described.

As an input system to the controller 40, there are connected a steering angle sensor 41, a steering torque sensor 43, a steering reaction force motor resolver 45, a turning motor resolver 47, a rack stroke sensor 49, a vehicle speed sensor 51, a yaw rate sensor 53, and an ignition switch 55.

The steering angle sensor 41 and the steering torque sensor 43 are arranged on the steering shaft 23. The steering angle sensor 41 detects the steering angle of the steering wheel 13 by the driver, and provides detected steering angle information to the controller 40. The steering angle sensor 41 is also referred to as "a steering angle detection section" in the present application. The steering torque sensor 43 detects the steering torque of the steering wheel 13 by the driver, and provides detected steering torque information to the controller 40.

The steering reaction force motor resolver 45 is arranged on the steering reaction force motor 16. The steering reaction force motor resolver 45 detects the rotational motion amount (steering angle) of the steering reaction force motor 16, and provides detected steering angle information to the controller 40. The steering reaction force motor resolver 45 is also referred to as to "the steering angle detection section", similarly to the steering angle sensor 41.

The turning motor resolver 47 is arranged on the turning motor 29. The turning motor resolver 47 detects the rotational motion amount (turning angle) of the turning motor 29 and provides detected turning angle information to the controller 40. The turning motor resolver 47 is also referred to as "a turning angle detection section" in the present application.

The rack stroke sensor 49 is arranged on the rack shaft 27. The rack stroke sensor 49 detects the linear motion amount (turning angle) of the rack shaft 27 and provides detected turning angle information to the controller 40. The rack stroke sensor 49 is also referred to as "the turning angle detection section", similarly to the turning motor resolver 47.

The vehicle speed sensor 51 detects the speed (vehicle speed) of the vehicle 10, and provides detected vehicle speed information to the controller 40. The vehicle speed sensor 51 is also referred to as "a vehicle speed detection section" in the present application. The yaw rate sensor 53 detects the yaw rate of the vehicle 10 and provides detected yaw rate information to the controller 40. The ignition switch 55 is a switch operated by the driver in starting an engine (not shown) mounted on the vehicle 10. ON/OFF state information of the ignition switch 55 is provided to the controller 40.

On the other hand, as an output system from the controller 40, there are connected the steering reaction force motor 16, the turning motor 29, and the electromagnetic solenoid 37.

The controller 40 has: a function to determine the steering mode of the vehicle steering device 11 as one of SBW mode, EPS mode, or manual steering mode, based on detection signals having been input via the input system, an abnormal diagnosis result related to respective elements of the vehicle steering device 11, and the like; a function to generate respective control signals for performing drive control of the steering reaction force motor 16, the turning motor 29, and the electromagnetic solenoid 37, according to the determined steering mode; and a function to perform the drive control of the steering reaction force motor 16, the turning motor 29, and the electromagnetic solenoid 37, based on the generated control signals.

During when the vehicle steering device 11 is in operation in the SBW mode, the controller 40 operates such as to transmit an appropriate reaction force (feeling at hand) related to steering, to the hands of the driver gripping the steering wheel 13, by performing the drive control of the steering reaction force motor 16.

Further, during when the vehicle steering device 11 is in operation in the SBW mode, the controller 40 operates such as to turn the pair of steered wheels 21a, 21b, according to the driving will of the driver, by performing the drive control of the turning motor 29 such as to make the actual turning angle of the pair of steered wheels 21a, 21b follow a target turning angle computed based on a steering angle and a steering torque.

Figure 2:
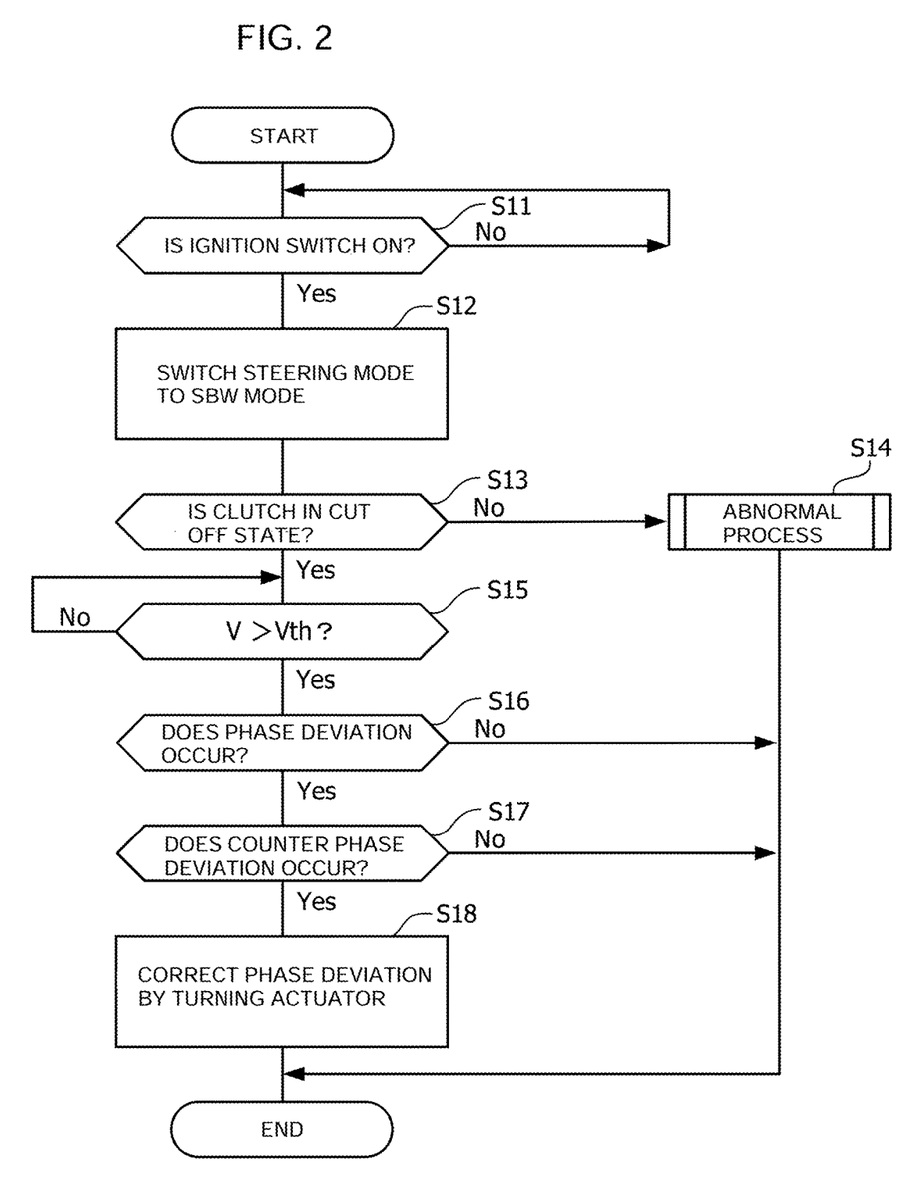
FIG. 2 is a flowchart diagram illustrating the operation of a control device in a SBW mode of steering on the vehicle steering device in the embodiment according to the invention.

Further, the controller 40 operates such as to make the driver perceive the allowed steering range of the steered wheels 21a, 21b as a feeling at hand caused by an increase in the steering reaction force, in such a manner that, for example as shown in FIG. 2, as the actual turning angle of the pair of steered wheels 21a, 21b become closer to a turning angle limit that defines the limit of the allowed steering range of the steered wheels 21a, 21b, the driving of the steering reaction force motor 16 is controlled to increase the steering reaction force so as to generate a wall reaction force.

Incidentally, a turning angle limit is a fixed value that is set, according to the design conditions of a turning mechanism.

Further, the controller 40 operates as follows. If the soldering force of the steering wheel 13 exceeds the wall reaction force, the drive control of the electromagnetic solenoid 37 is performed such as to switch the clutch device 19 from a disconnected state to a connected state so that occurrence of phase shift, which is related to the correspondence relationship between the steering angle and the actual turning angle of the steered wheels 21a, 21b, is inhibited.

Herein, the wall reaction force refers to a steering reaction force that is given by driving the steering reaction force motor 16 such as to counteract the steering force of the steering wheel 13, in consideration that the actual steering angle of the steered wheels 21a, 21b does not exceed the turning angle limit. Whether or not the steering force of the steering wheel 13 exceeds the wall reaction force is determined, for example, based on a result of determination whether or not a steering torque detected by the steering angle sensor 41 exceeds a torque corresponding to the wall reaction force.

Further, if a later-described determination section 61 has determined that a specific phase shift (which is based on the type and magnitude of phase shift) occurs and if a vehicle speed V exceeds a predetermined vehicle speed threshold $V_{th}$ for the first time after the ignition switch 55 is turned on, the controller 40 judges that a strange feeling given to the driver is comparatively strong (to an extent such as to interfere driving), and performs drive control of the turning motor 29. By thus correcting the turning angle of the steered wheels 21a, 21b such that the turning angle matches the steering angle of the steering wheel 13, the controller 40 operates such as to inhibit (including elimination) the specific phase shift. Herein, the correction of the turning angle of the steered wheels 21a, 21b such that the turning angle matches the steering angle of the steering wheel 13 includes a concept of making the turning angle of the steered wheels 21a, 21b approach the steering angle of the steering wheel 13 for consistency (an incomplete consistency state after correction).

In detail, the controller 40 is provided with the determination section 61 and a drive control section 63

The determination section 61 has a function to perform determination whether or not the vehicle speed V exceeds the predetermined vehicle speed threshold $V_{th}$ for the first time after turning on of the ignition switch 55 and to determine whether or not a phase shift related to the correspondence relationship between the steering angle of the steering wheel 13 and the actual turning angle of the steered wheels 21a, 21b occurs. Particularly, the determination section 61 performs determination whether or not a specific phase shift occurs, based on the type and magnitude of the phase shift. A specific phase shift is assumed to be a phase shift at a time when the correspondence relationship between the steering angle and the turning angle is in an inverse phase wherein the strange feeling given to the driver is comparatively strong (to an extent such as to interfere driving).

A specific phase shift is a concept including the following three forms. The first one is a phase shift in a state that the steered wheels 21a, 21b face either a right turn direction or a left turn direction despite that the steering wheel 13 is in a neutral position. The second one is a phase shift in a state that the steered wheels 21a, 21b face the straight-ahead direction despite that the steering wheel 13 is located either at a right turn position or at a left turn position. A third one is a phase shift where the steered wheels 21a, 21b face a left turn direction (or a right turn direction) despite that the steering wheel 13 is at a right turn position (or a left turn position).

In detail, the determination section 61 performs determination whether or not a phase shift occurs when the vehicle speed V exceeds the vehicle speed threshold $V_{th}$ for the first time after the ignition switch 55 is turned on. At this moment, if it is determined that a phase shift occurs, the determination section 61 performs diagnosis and evaluation of the type and the magnitude (shift amount) of the phase shift. The diagnosis and the evaluation of phase shift are performed, for example, based on steering angle information detected by the steering angle sensor 41, turning angle information detected by the rack stroke sensor 49 and respective midpoint information related to the steering angle and the turning angle.

Incidentally, as the respective midpoint information, for example, origin point information related to both the steering angle sensor 41 and the rack stroke sensor 49 (which can either be fixed or renewed as appropriate) can be appropriately adopted.

If the vehicle speed V exceeds the vehicle speed threshold $V_{th}$ for the first time after the ignition switch 55 is turned on and if the determination section 61 has determined that the specific phase shift occurs, the drive control section 63 judges that a strange feeling given to the driver is comparatively strong (to an extent such as to interfere driving), and performs drive control of the turning motor 29. By thus correcting the turning angle of the steered wheels 21*a*, 21*b* such that the turning angle matches the steering angle of the steering wheel 13, the controller 40 inhibits the specific phase shift.

In the following, the operation of the controller 40 at a start of the vehicle 10 having the vehicle steering device 11 mounted on it will be described, referring to FIG. 2.

In step S11 in FIG. 2, the controller 40 determines whether or not the ignition switch 55 has been turned on. As a result of determination in step S11, if it has been determined that the ignition switch 55 has not been turned on ("No" in step S11), the controller 40 performs control to repeat the determination process in step S11.

On the other hand, as a result of determination in step S11, if it has been determined that the ignition switch 55 has been turned on ("Yes" in step S11), the controller 40 moves the flow of the process to step S12.

In step S12, the controller 40 performs drive control of the electromagnetic solenoid 37 such as to switch the clutch device 19 from the connected state (non-SBW mode) to the disconnected state (SBW mode).

In step S13, the controller 40 determines whether or not the clutch device 19 has been switched to the disconnected state (SBW mode). This determination can be made corresponding to whether or not the steering angle of the steering wheel 13 and the actual turning angle of the steered wheels 21*a*, 21*b* are in an asynchronous operation state. As a result of determination in step S13, if it has been determined that the clutch device 19 has not been switched to the non-disconnected state (SBW mode) ("No" in step S13), the controller 40 moves the flow of the process to the next step S14.

On the other hand, as a result of the determination in step S13, it has been determined that the clutch device 19 has been switched to the disconnected state (SBW mode) ("Yes" in step S13), the controller 40 makes the flow of process jump to step S15.

In step S14, if the clutch device 19 has not been switched to the disconnected state despite that the process to switch the clutch device 19 from the connected state (non-SBW mode) to the disconnected state (SBW mode) has been performed, the controller 40 performs an abnormal process to notify the fact that an abnormality occurs on the steering system. Thereafter, the controller 40 terminates the flow of the series of processes.

In step S15, the determination section 61 of the controller 40 performs determination whether or not the vehicle speed V exceeds the vehicle speed threshold $V_{th}$ (after the ignition switch 55 is turned on). As a result of the determination in step S15, if it has been determined that the vehicle speed V has not exceeded the vehicle speed threshold $V_{th}$ ("No" in step S15), the controller 40 repeats the determination in step S15 until it is determined that the vehicle speed V exceeds the vehicle speed threshold $V_{th}$.

On the other hand, as a result of the determination in step S15, if it has been determined that the vehicle speed V exceeds the vehicle speed threshold $V_{th}$ (for the first time) ("Yes" in step S15), the controller 40 moves the flow of process to the next step S16.

In step S16, the controller 40 performs determination whether or not phase shift occurs. As a result of the determination in step S16, if it has been determined that phase shift has not occurred ("No" in step S16), the controller 40 terminates flow of the series of processes.

On the other hand, as a result of the determination in step S16, if it has been determined that phase shift occurs ("Yes" in step S16), the controller 40 moves the flow of process to the next step S17.

In step S17, the determination section 61 of the controller 40 performs determination whether or not the phase shift is an inverse phase shift. As a result of the determination in step S17, if it has been determined that the phase shift is not an inverse phase shift (but a same direction phase shift) ("No" in step S17), the controller 40 terminates the series of processes.

On the other hand, as a result of the determination in step S17, if it has been determined that the phase shift is an inverse phase shift ("Yes" in step S17), the controller 40 moves the flow of process to the next step S18.

In step S18, the drive control section 63 of the controller 40 judges that the strange feeling given to the driver is comparatively strong (to an extent such as to interfere driving), and performs drive control of the turning motor 29. Thus, the drive control section 63 of the controller 40 corrects the turning angle of the steered wheels 21*a*, 21*b* such that the turning angle matches the steering angle of the steering wheel 13. In such a manner, the controller 40 operates to inhibit the specific phase shift. Thereafter, the controller 40 terminates the series of processes.

[Function and Effect of Vehicle Steering Device 11 in Embodiment of the Invention]

In the following, the function and effect of a vehicle steering device 11 in an embodiment according to the invention will be described.

A vehicle steering device 11 based on the first aspect of the invention is provided with: a steering reaction force generation device (steering section) 15 including a steering wheel (steering member) 13 operated in steering steered wheels 21*a*, 21*b* of the vehicle 10; a steering reaction force motor resolver (a steering angle detection section) 45 for detecting the steering angle of the steering wheel 13 (steering member); a turning device (turning section) 17 having a turning motor (turning actuator) 29 for supplying a turning force for turning the steered wheels 21*a*, 21*b* and being capable of turning the steered wheels 21*a*, 21*b* in a state that of being mechanically disconnected from the steering reaction force generation device (steering section) 15; a turning motor resolver (turning angle detection section) 47 for detecting a turning angle of the steered wheels 21*a*, 21*b*; a drive control section (control section) 65 for performing drive control of the turning motor 29; and a vehicle speed sensor (vehicle speed detection section) 51 for detecting the vehicle speed of the vehicle 10.

If the vehicle speed V exceeds a predetermined vehicle speed threshold $V_{th}$ for the first time after the ignition switch 55 is turned on and if a specific phase shift related to the correspondence relationship between the steering angle of the steering wheel 13 and the turning angle of the steered wheels 21*a*, 21*b* occurs, the drive control section 63
Performs drive control of the steering motor 29 and
Thereby corrects the turning angle of the steered wheels 21*a*, 21*b* such that the turning angle matches the steering angle of the steering wheel 13. In such a manner, the specific phase shift is inhibited.

Herein, the specific phase shift based on the type and the magnitude of phase shift is assumed to be a phase shift that gives a comparatively strong (to an extent such as to interfere driving) strange feeling to a driver. As the predetermined vehicle speed threshold $V_{th}$, for example, a comparatively low vehicle speed V of slow driving or so can be set, as appropriate.

Incidentally, if the vehicle speed V exceeds the predetermined vehicle speed threshold $V_{th}$ for the first time after the ignition switch 55 is turned on, the operation for inhibiting the specific phase shift is performed by the following reason. That is, if correction is made, during when the vehicle 10 is moving, such as to make the turning angle of the steered wheels 21a, 21b match the steering angle of the steering wheel 13, the driving torque of the turning motor 29 can be lowered, compared with a case of performing the above correction during when the vehicle 10 is in a stop state. Further, it is also aimed at avoiding a time when the vehicle 10 is in a stop state in which checking or the like of the vicinity of the turning device 17 may be being performed by a checker.

By the vehicle steering device 11 based on the first aspect, if it has been determined that the vehicle speed V exceeds the predetermined vehicle speed threshold $V_{th}$ for the first time after the ignition switch 55 is turned on and if it has been determined that the specific phase shift (inverse phase shift) based on the type and the magnitude of phase shift occurs, drive control of the turning motor 29 is performed, and thus the turning angle of the steered wheels 21a, 21b is corrected such that the turning angle of the steered wheels 21a, 21b matches the steering angle of the steering wheel 13 (The turning angle may be in a state of incomplete consistency.) Thus, even when a specific phase shift based on the type and the magnitude of phase shift occurs, this specific phase shift can be adequately inhibited.

A vehicle steering device 11 based on the second aspect of the invention is the vehicle steering device 11 based on the first aspect, and is featured by that the specific phase shift is an inverse phase shift related to the correspondence relationship between the steering angle and the turning angle. For the vehicle steering device 11 based on the second aspect, a specific phase shift is defined, based on a point of view of the type of a phase shift, namely whether it is related to same phase shift or inverse phase shift.

By the vehicle steering device 11 based on the second aspect, the specific phase shift is the phase shift at the time when the correspondence relationship between the steering angle and the turning angle is in reverse phase shift. Accordingly, if the correspondence relationship between the steering angle and the turning angle is in reverse phase shift, by adequately inhibiting such a specific phase shift, motion of the steered wheels 21a, 21b against the steering will of the driver can be avoided in advance.

A vehicle steering device 11 based on the third aspect is the vehicle steering device 11 based on the second aspect, wherein a specific phase shift is a phase shift in a state that the steered wheels 21a, 21b face towards a right turning direction or a left turning direction despite that the steering wheel 13 is in the neutral position.

By the vehicle steering device 11 based on the third aspect, as the specific phase shift is a phase shift in a state that the steered wheels 21a, 21b face towards a right turning direction or a left turning direction despite that the steering wheel 13 is in the neutral position, by adequately inhibiting such a specific phase shift in such an event, motion of the steered wheels against the steering will of the driver can be avoided in advance.

A vehicle steering device 11 based on a fourth aspect is the vehicle steering device 11 based on the second aspect, and is featured by that the specific phase shift is a phase shift in a state that the steered wheels 21a, 21b face the straight-ahead direction despite that the steering wheel 13 is located either at a right turn position or at a left turn position.

By the vehicle steering device 11 based on the fourth aspect, as the specific phase shift is a phase shift in a state that the steered wheels 21a, 21b face the straight-ahead direction despite that the steering wheel 13 is in a right turning position or a left turning position, by adequately inhibiting such a specific phase shift in such an event, motion of the steered wheels against the steering will of the driver can be avoided in advance.

Other Embodiments

The embodiments described above are examples of carrying out the present invention. Accordingly, the technical scope of the present invention should not be understood by being limited thereto. This is because the invention can be carried out in various embodiments, without departing from the spirit or the main features of the invention.

For example, in the description of the embodiment of the invention, an example in which the clutch device 19 having the planetary gear train 31 was taken, however, the invention is not limited thereto. Any configuration can be adopted for the clutch device 19 as long as the steering shaft 23 and the turning shaft 25 can be connected with each other and disconnected from each other.

What is claimed is:

1. A vehicle steering device, comprising:
a steering section having a steering member operated in turning steered wheels of a vehicle;
a steering angle detection section for detecting a steering angle of the steering member;
a turning section having a turning actuator for applying a turning force for turning the steered wheels and being capable of turning the steered wheels in a state that the turning section is mechanically disconnected from the steering section;
a turning angle detection section for detecting a turning angle of the steered wheels;
a control section for performing drive control of the turning actuator; and
a vehicle speed detection section for detecting vehicle speed of the vehicle,
wherein if the vehicle speed exceeds a predetermined vehicle speed threshold for the first time after an ignition switch is turned on and if a specific phase shift related to correspondence relationship between the steering angle and the turning angle occurs, the control section performs drive control of the turning actuator to thereby correct the turning angle of the steered wheels such that the turning angle of the steered wheels matches the steering angle of the steering wheel.

2. The vehicle steering device according to claim 1, wherein the specific phase shift is a phase shift at a time when the correspondence relationship between the steering angle and the turning angle is an inverse phase shift.

3. The vehicle steering device according to claim 1, wherein the specific phase shift is a phase shift in a state that the steered wheels face towards a right turning direction or a left turning direction despite that the steering member is in a neutral position.

4. The vehicle steering device according to claim 1, wherein the specific phase shift is a phase shift in a state that the steered wheels face towards a straight-ahead direction despite that the steering member is in either a right turning position or a left turning position.

\* \* \* \* \*